May 9, 1967 M. J. OLAFSON 3,319,041
ELECTRIC BUTT WELDING OF THIN FLAT WIRE
Filed July 18, 1963

United States Patent Office 3,319,041
Patented May 9, 1967

3,319,041
ELECTRIC BUTT WELDING OF THIN FLAT WIRE
Magnus J. Olafson, Morrisville, Pa., assignor to CF&I Steel Corporation, a corporation of Colorado
Filed July 18, 1963, Ser. No. 295,988
3 Claims. (Cl. 219—105)

The present invention relates to welding and more particularly to butt welding thin flat wire sections.

Thin metal strip, generally called flat wire, is usually made in sections, or coils, a number of which are joined together by electrical resistance butt welding to make a large package. Such a large package of flat wire is desirable for processing steps connected with production of the flat wire and for fabrication steps connected with use of the flat wire.

For flat wire thicknesses above about .020″, conventional electrical resistance welding techniques have been found satisfactory to produce butt welds. However, for flat wire thicknesses below .020″, and especially thicknesses below about .012″, serious problems have been encountered in butt welding by the usual methods.

A major difficulty which has been encountered in making satisfactory electrical resistance butt welds of thin flat wire has arisen from the flexibility of the material. Thus, as the metal is heated in the welding operation, the abutting ends must be forced together to cause a mingling of the plastic heated portions, resulting in an upset section, called a bead, which is the weld. The force necessary to accomplish the mingling causes a buckling of the thin strip and improperly formed, often lapped, welds. Such improperly formed welds are not strong and tend to break when stressed.

The welds must be strong enough to permit the joined sections of flat wire to be pulled through various processing and fabricating machines. Breaks occurring while the wire is being pulled cause expensive manufacturing delays. With conventional techniques previously used it has been found that for thin flat wires, i.e., wires less than about .020″ thick, a high percentage of weld breaks occurred, and for wires less than about .012″ thick more than 50% of the welds broke.

The principal object of the invention has been to provide a novel and improved method of butt welding thin flat wire sections.

More particularly, it has been an object of the invention to provide a novel and improved method of butt welding thin flat wire sections which results in a substantially stronger weld than previously obtainable by electrical resistance welding.

A further object of the invention has been to provide such a method which can employ ordinary electrical resistance welding apparatus but which avoids the high rate of weld breaks previously encountered.

Another object of the invention has been to provide such a method which is suitable for butt welding thin flat wires having thicknesses as low as .004″ or less.

Still another object of the invention has been the provision of thin flat wire sections or strips the end portions of which are shaped to facilitate electrical resistance butt welding.

In accordance with the invention, the end portions of thin flat wire strips are butt welded together by first forming a series of closely spaced, axially extending crimps in the end portions of the strips, then abutting the end portions and urging them to move axially into each other while passing an electrical current through the end portions to heat them to a welding temperature.

Other and further objects, features and advantages of the invention will appear more fully from the following description taken in connection with the appended drawing, in which.

Figure 1:
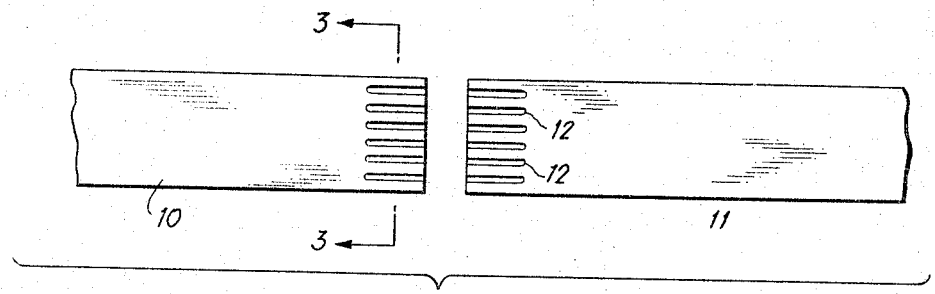
FIG. 1 is a plan view showing the ends of two strips of thin flat wire embodying the invention which are to be joined by electrical resistance welding.
Figure 2:
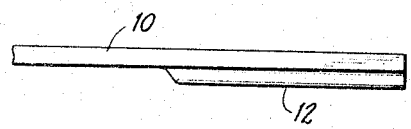
FIG. 2 is an enlarged side elevational view of the end of one of the strips of FIG. 1.

Referring now to the drawings, there are shown in FIG. 1 the end portions of two flat wire strips 10 and 11 which are to be joined by butt welding. The strips 10 and 11 might be, for example, from about .004″ to 0.012″ thick, although the principles of the invention are applicable to flat wires having thicknesses above and below this range. The adjacent ends of the strips 10 and 11 are each provided with a series of closely spaced, axially extending, parallel crimps or ribs 12 formed by forcing down portions of the surfaces of the strips.

Typically, the strip ends may be placed between mating serrated dies which are forced together to impart the permanent crimps in the strip ends. Other mechanisms for forming the crimps may be used. The crimps or ribs 12 need not all project in the same direction from the strip surface. Thus, some might project upwardly and some downwardly. However, preferably, all of the crimps or ribs project in the same direction, as shown.

The axial lengths of the crimps may be varied widely so long as sufficient length is provided to afford substantial stiffening of the strip ends. In general, the axial lengths of the crimps should be sufficient so that portions of each crimp extend well beyond the portions of the metal rendered plastic during the welding operation. A typical axial length for the crimps 12 might be ⅜″.

The depth of the crimps, i.e., the vertical distance between flat wire surface 13 and crimp top surface 14, is preferably selected to lie in the range of about 20% to 100% of the wire thickness, the greater percentage values being used for thinner flat wire strips. This range need not be adhered to strictly, and relatively deeper or shallower crimps may be used. Typically, a crimp might be .004″ to .006″ deep, which values have been found suitable for steel strips .004″ to .012″ thick.

Figure 3:
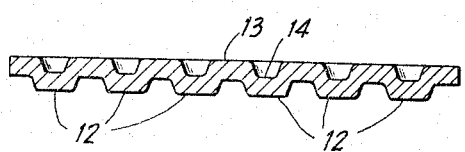
FIG. 3 is an enlarged cross-sectional view taken along the line 3—3 of FIG. 1.
Figure 5:
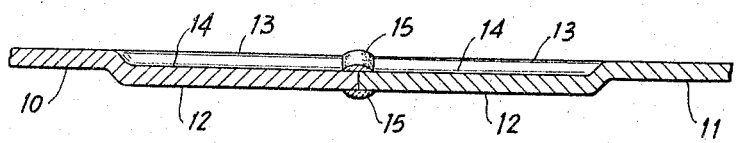
FIG. 5 is an enlarged cross-sectional view taken along the line 5—5 of FIG. 4.

The crimp widths may be varied considerably, but preferably are equal to or slightly less than the widths of the lands between crimps. The number of crimps provided can also be varied. Typically, five crimps might be provided in a ⅜″ wide flat wire strip, and seven crimps might be provided in a ½″ wide flat wire strip. The shape of the crimps may also be varied. For example, V-shaped or rounded shaped bottoms might be used in place of the flat bottomed crimps shown in FIG. 3. However, the side walls of the crimps and the side walls of the lands between the crimps are preferably inclined, as shown in FIG. 3, to facilitate the crimping operation.

The dimensions and numerical examples given above are intended only by way of illustration, these values being for typical steel flat wire strips.

In welding, the crimped ends of the strips 10 and 11 are abutted and are urged together while being heated by a conventional electrical resistance welding apparatus to render the abutting ends soft enough to be forced into each other, resulting in formation of a head 15 along the line of juncture. The bead 15 projects both above and below the strip surfaces. While the bead 15 may not extend in a straight line directly across the joined strip, the bead 15 will usually be more nearly straight than in the case of similar strips not provided with crimps. Irregularities in the path of the weld result from the fact that the weld line follows the path of greatest plasticity of the heated metal.

Figure 4:
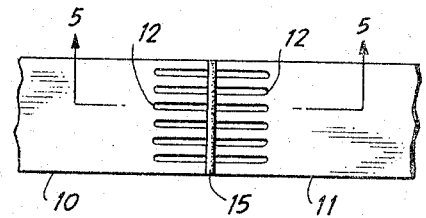
FIG. 4 is a plan view showing the strips of FIG. 1 after having been butt welded.

Any of the electrical resistance welding machines intended for use with flat wire may be used to effect the welding of the strip ends 10 and 11. As shown in FIG. 4, each of the crimps 12 of strip 10 is in axial alignment with a corresponding crimp 12 of strip 11. However, such axial alignment is not essential.

The weld beads 15 are usually partially or entirely ground away after welding to avoid a snag point on the wire strip. The strip in the region of the weld will be discolored due to the effects of the high welding temperature on the metal. This discoloration of the metal and the distortion of the metal surfaces due to the presence of the crimps or ribs 12 are not detrimental to the end use of the wire, since the welds serve as connections only and are cut out in final fabrication steps so as not to enter the final product. Cutting out of the welded areas is required since the metal structure in the region of the weld differs from the metal structure of the rest of the strip.

In forming the crimps or ribs 12 in the flat wire strip, it has been found desirable to mount the dies in association with the jaws of the shears which are used to square off the ends of the strip. For example, a serrated die shoe may be attached to the movable shearing blade and a mating die shoe may be attached to the fixed shearing blade. In this way, immediately after the end of the flat wire strip is sheared off, the portion adjacent the sheared end is subjected to the crimping action by the die shoes.

While the invention has been described in connection with specific embodiments thereof and in a specific use, various modifications thereof will occur to those skilled in the art without departing from the spirit and scope of the invention as set forth in the appended claims.

What is claimed is:

1. The method of butt welding together the end portions of thin flat wire strips having a thickness lying in the range of about .004" to .012", comprising the steps of forming a series of closely spaced, parallel, axially extending crimps in said end portions of said strips, said crimps having a depth lying in the range of about 20% to 100% of the strip thickness, abutting said end portions, and urging said end portions to move axially into each other while passing an electrical current through said abutting end portions to heat the same to a temperature at which said abutting end portions become softened and are welded together.

2. The method of butt welding together the end portions of thin flat wire strips having a thickness lying in the range of about .004" to .020", comprising the steps of forming a series of closely spaced, parallel, axially extending crimps in said end portions of said strips, said crimps having a depth lying in the range of about 20% to 100% of the strip thickness, abutting said end portions, and urging said end portions to move axially into each other while heating said abutting end portions to a temperature at which said abutting end portions become softened and are welded together.

3. The method of butt welding together the end portions of thin flat wire strips having a thickness lying in the range of about .004" to .012", comprising the steps of forming a series of closely spaced, parallel, axially extending crimps in said end portions of said strips, said crimps having a depth lying in the range of about .004" to .006", said crimps having axial lengths greater than the lengths of said strips heated to a welding temperature in a subsequent heating step, abutting said end portions, and urging said end portions to move axially into each other while passing an electrical current through said abutting end portions to heat the same to a temperature at which said abutting end portions become softened and are welded together.

References Cited by the Examiner

UNITED STATES PATENTS

| | | | |
|---|---|---|---|
| 1,924,220 | 8/1933 | Turnquist | 219—105 X |
| 1,930,285 | 10/1933 | Robinson | 219—58 X |
| 1,966,210 | 7/1934 | Miller | 219—100 |
| 2,927,193 | 3/1960 | Ewald | 219—100 |

RICHARD M. WOOD, *Primary Examiner.*

ANTHONY BARTIS, *Examiner.*

R. F. STAUBLY, *Assistant Examiner.*